United States Patent [19]
Lien

[11] Patent Number: 6,004,464
[45] Date of Patent: Dec. 21, 1999

[54] SPENT BRINE RECLAMATION

[75] Inventor: Larry A. Lien, Solana Beach, Calif.

[73] Assignee: Desalination Systems, Inc., Vista, Calif.

[21] Appl. No.: 09/115,156

[22] Filed: Jul. 14, 1998

[51] Int. Cl.$^6$ .................................................. B01D 61/04
[52] U.S. Cl. .......................... 210/639; 210/651; 210/652
[58] Field of Search .................................... 210/639, 651, 210/652, 653, 654, 638

[56] References Cited

U.S. PATENT DOCUMENTS

| | | | |
|---|---|---|---|
| 4,176,057 | 11/1979 | Wheatley | 210/639 |
| 4,277,447 | 7/1981 | Chambers | 423/165 |
| 4,336,232 | 6/1982 | Moritz | 423/164 |
| 4,714,113 | 12/1987 | Mohnot | 166/270 |
| 4,889,633 | 12/1989 | Pfenninger | 210/639 |
| 5,254,257 | 10/1993 | Brigano et al. | 210/639 |
| 5,587,083 | 12/1996 | Twardowski | 210/652 |

OTHER PUBLICATIONS

Larry A. Lien, "Presentation on Nanofiltration", Water Quality Association, 1993 Annual Convention & Exhibition in San Antonio, TX, Mar. 17, 1993 pp. 1–26.

Larry Lien, "Nanofiltration: Trend of the Future?", *Water Conditioning & Purification*, pp. 24–26, Sep. 1992.

Larry Lien, Overhead Projection Slides shown at PWCA Meeting Presentation in Santa Barbara, May, 1992 pp. 1–5.

*Primary Examiner*—Ernest G. Therkorn
*Attorney, Agent, or Firm*—Fitch, Even, Tabin & Flannery

[57] ABSTRACT

A method of reclaiming spent aqueous brine solutions used in the regeneration of water-softening resins. An aqueous solution chloride or other brine is acidified with HCl to a pH of between about 0.5 and 6 and a soluble sulfate salt, preferably $Na_2SO_4$ is added, together with a precipitation inhibitor of the type polyacrylamide. Following such treatment, the spent brine is pumped at high pressure axially through a spirally-wound nanofiltration-type membrane device which is effective to remove at least about 90% of the divalent hardness while allowing passage therethrough of at least about 90% of the monovalent cations. As a result of such treatment, about 90 to 95% of the volume of spent brine can be efficiently and effectively reclaimed in a form in which it is suitable for use again in regenerating water-softening resins or the like.

19 Claims, 2 Drawing Sheets

SPENT BRINE RECLAMATION

The invention relates generally to reclaiming spent aqueous brine solution by removing divalent cations by the use of a semipermeable membrane, and more particularly to the reclamation of spent brine solutions that result from the regeneration of water-softening resins or the like so as to facilitate the reuse of a major portion of such spent brine and significantly reduce waste discharges from such a water-softening resin regeneration operation.

BACKGROUND OF THE INVENTION

Water softeners and the like use ion exchange resins, such as zeolite resins, to remove polyvalent ions from aqueous streams by exchanging them with monovalent cations such as sodium. When there are few sodium ions left on such resins, it becomes necessary to regenerate the ion exchange resins by treatment with an aqueous brine containing sodium chloride or the like, e.g. potassium chloride. As a part of this regeneration, the polyvalent cations are solubilized and replaced on the resin with sodium ions. The resultant aqueous solution contains some sodium chloride plus the solubilized polyvalent ions and is generally referred to as "spent brine". Although heretofore it has usually been acceptable to simply discharge such spent brine into a municipal sewer system, environmental restraints are being imposed throughout many parts of the United States, and the need to conserve water has also dictated that efforts be made to reclaim such spent brine.

In May of 1992, Larry Lien of Membrane Development Specialists, Inc. was asked to speak at the semiannual meeting of the Pacific Water Quality Association in Santa Barbara, Calif. At that meeting, the concept of reclaiming spent brine used to regenerate water-softening resins was recommended, and it was suggested a semipermeable membrane separation treatment, specifically one using spirally-wound elements or cartridges made of the DS-5 nanofiltration membrane being marketed by Desalination Systems, Inc., might be advantageously employed. The adoption of such spent brine reclamation systems was advocated so as to reduce the cost of sodium chloride and reduce sewer charges, as well as because it would be an environmentally sound practice.

In July of 1992, an article was published in *Water Technology* entitled "Brine Recovery" that was authored by Howard Connor which likewise advocated the recovery of spent brine. In September of 1992, Larry Lien published an article entitled, "Nanofiltration: Trend of the Future?" in *Water Conditioning and Purification* describing uses of such nanofiltration elements for a variety of applications. This article was followed with a presentation at the Annual Convention of the Water Quality Association in San Antonio, Tex. (March 1993).

In January of 1993, a United States patent application was filed, which issued later that year as U.S. Pat. No. 5,254,257. It is directed specifically to the concept of purifying spent brine from the regeneration of ion exchange resins. The patent discloses the use of DS-5 nanofiltration membrane cartridges for spent brine reclamation by first acidifying the spent brine with hydrochloric acid to a pH of about 1.5 to 2.4 and subsequently treating the purified or reclaimed brine with sodium hydroxide to raise the pH.

Sodium chloride has long been used as a feed material to electrolytic cells where electrolysis produces chlorine and sodium hydroxide, and processes have been developed for removing polyvalent cations, such as calcium, magnesium, iron, chromium, barium, strontium, nickel, molybdenum and the like from such sodium chloride brines prior to electrolysis. Such processes have generally involved the use of chemicals that cause precipitation of these polyvalent ions. U.S. Pat. Nos. 4,277,447 and 4,336,232 are generally representative of such processes for purifying sodium chloride or the like brines by the removal of such polyvalent cations. U.S. Pat. No. 5,587,083 discloses the removal of divalent ions from an aqueous chlorate feed liquor using nanofiltration membranes.

The demands on water resources in the United States have continued to increase, and environmental regulations with respect to sewer discharges continue to grow even more stringent. As a result, efforts have continued for the purpose of developing even more efficient reclamation processes for spent brine.

SUMMARY OF THE INVENTION

It has now been found that spent aqueous brine solutions from the regeneration of water-softening resins or the like can be efficiently and effectively reclaimed by treating an acidified solution with a soluble sulfate salt and a precipitation inhibitor prior to applying the treated solution to a nanofiltration membrane which is designed to selectively reject divalent and other polyvalent cations. Preferably, the spent brine is acidified to a pH of between about 0.5 and about 6 and is treated with a soluble sulfate, such as sodium, potassium, lithium or ammonium sulfate or hydrogen sulfate (sometimes termed bisulfate), in an amount at least about equal to one-half the total weight of the calcium and magnesium ions contained therein. The precipitation inhibitor is preferably of the polyacrylamide type, such as that which is sold as Cyanamer P-70. By employment of a spirally-wound nanofiltration cartridge which has feed-channel-providing spacer material having a thickness of at least about 1 mm, the treated brine can be efficiently pumped to a pressure between about 600 and about 1,000 psi and then applied to the cartridge, at which pressure it will have an axial velocity of at least about 10–15 cm per second; as a result, it is found to be efficient and economical to recover about 90 to 95 volume % of the spent brine that is being treated having less than 10% of the original hardness, thus reducing the amount of waste to be discharged to a sewer or otherwise disposed of by as much as a factor of about 20. Moreover, brine containing TDS over 100,000 ppm and hardness of at least 17,000 ppm can be reclaimed as brine with hardness of not more than 1,000 ppm.

DETAILED DESCRIPTION OF THE PREFERRED EMBODIMENTS

It is presently considered important to be able to minimize the amount of waste liquid that is either discharged to a municipal sewer or otherwise disposed of in an appropriate landfill or the like; however, if, as a result of reclaiming spent aqueous brine, the cost of water and other raw material is reduced. The realization of still further advantages is made possible. It has been found that it is possible to efficiently and economically recover for reuse 85% or higher, and often about 90 to 95%, of the volume of spent brine by effectively removing divalent and other polyvalent cations therefrom using semipermeable membranes of the nanofiltration type in a method embodying features of this invention. Such high recovery amounts are achieved in this efficient method by the addition of significant amounts of a soluble sulfate and a suitable anti-precipitation agent to the spent brine and by pumping such treated brine to a pressure which assures high velocity flow through a membrane-type separation device, preferably a spirally-wound cartridge that incorporates a relatively thick feed spacer.

Figure 1:
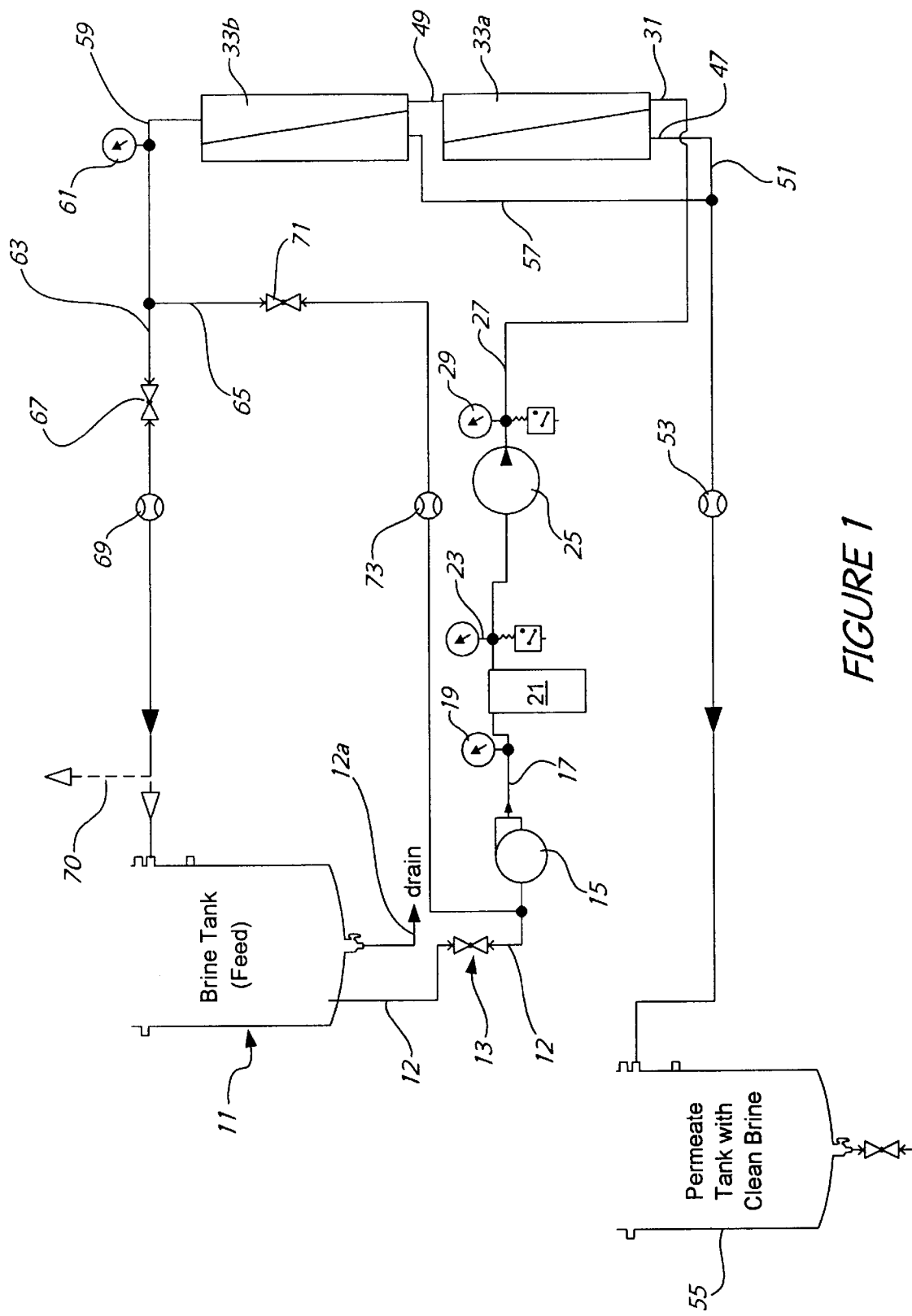
FIG. 1 is a schematic view of a system which may be employed in a method embodying various features of the invention that is designed to reclaim spent brine obtained from the regeneration of water-softening resins.

Illustrated diagrammatically in FIG. 1 is a representative system for recovering spent brine that was used for the regeneration of water-softening resins or the like, so that such brine is now contaminated with relatively high amounts of hardness, primarily in the form of divalent calcium and magnesium cations and to a lesser extent barium cations. While the illustrated system is designed for batch operation, one having the ordinary skill in this art will realize that it can easily be adapted to continuous operation, if desired, where recovery of about 85% or higher of the feed volume is easily achieved.

Shown is a brine feed tank 11 wherein an initial quantity of spent brine, for example 1,000 gallons, would be collected. The brine is acidified to a pH between about 0.5 and about 6, and preferably to a pH between about 2 and about 5. Preferably, hydrochloric acid is used for the acidification; however, other strong acids that may alternatively be used include sulfuric, nitric and phosphoric. The spent brine to be reclaimed is analyzed for hardness; typical spent brines from the regeneration of water-softening resins may contain total dissolved solids (TDS) in the range of about 100,000 to 150,000 ppm, of which hardness (measured as calcium carbonate) may measure from 10,000 to 25,000 ppm. Average values might be considered to be about 17,500 to 19,000 ppm of hardness measured as $CaCO_3$. An appropriate precipitation inhibitor or antiscalant is also added to facilitate high recovery. The preferred antiscalant is one of the polyacrylamide chemical family, one example of which is sold under the tradename Cyanamer P-70 by the American Cyanamid Company. Other antiscalants based upon polyacrylic acid or polymalic acid, as are well known, may be used. Preferably, such an antiscalant is used in an amount between about 5 and about 10 ppm.

The treated spent brine is permitted to flow by gravity through an outlet line 12, which includes a check valve 13, to a booster pump 15, which may be one which is designed to pump about 40 gallons per minute against a head of about 40 feet of water. The outlet line 12 may be located off-center to allow a line 12a from the lowest point in the tank to be opened to drain via a suitable valve. A discharge line 17 from the booster pump 15 contains a pressure gauge 19 and a cartridge filter 21 to physically remove any particulate matter in the spent brine feed. On the downstream side of the cartridge filter 21, a combined pressure gauge/release valve 23 is located in the line 17 which then leads to a main high-pressure pump 25, which may be chosen so as to increase the pressure to between about 400 and 1,000 psig, often to at least about 600 psig. In the exemplary system, the pump 25 is designed to pump about 8.5 gallons per minute with a discharge pressure of about 400–800 psig. A second pressure gauge/release valve combination is located in an outlet line 27 from the high pressure pump 25, and this line 27 connects to an inlet 31 of a nanofiltration system, which in the illustrated embodiment includes two spirally-wound nanofiltration cartridges 33 disposed in separate pressure vessels 33a and 33b and connected in series.

Figure 2:
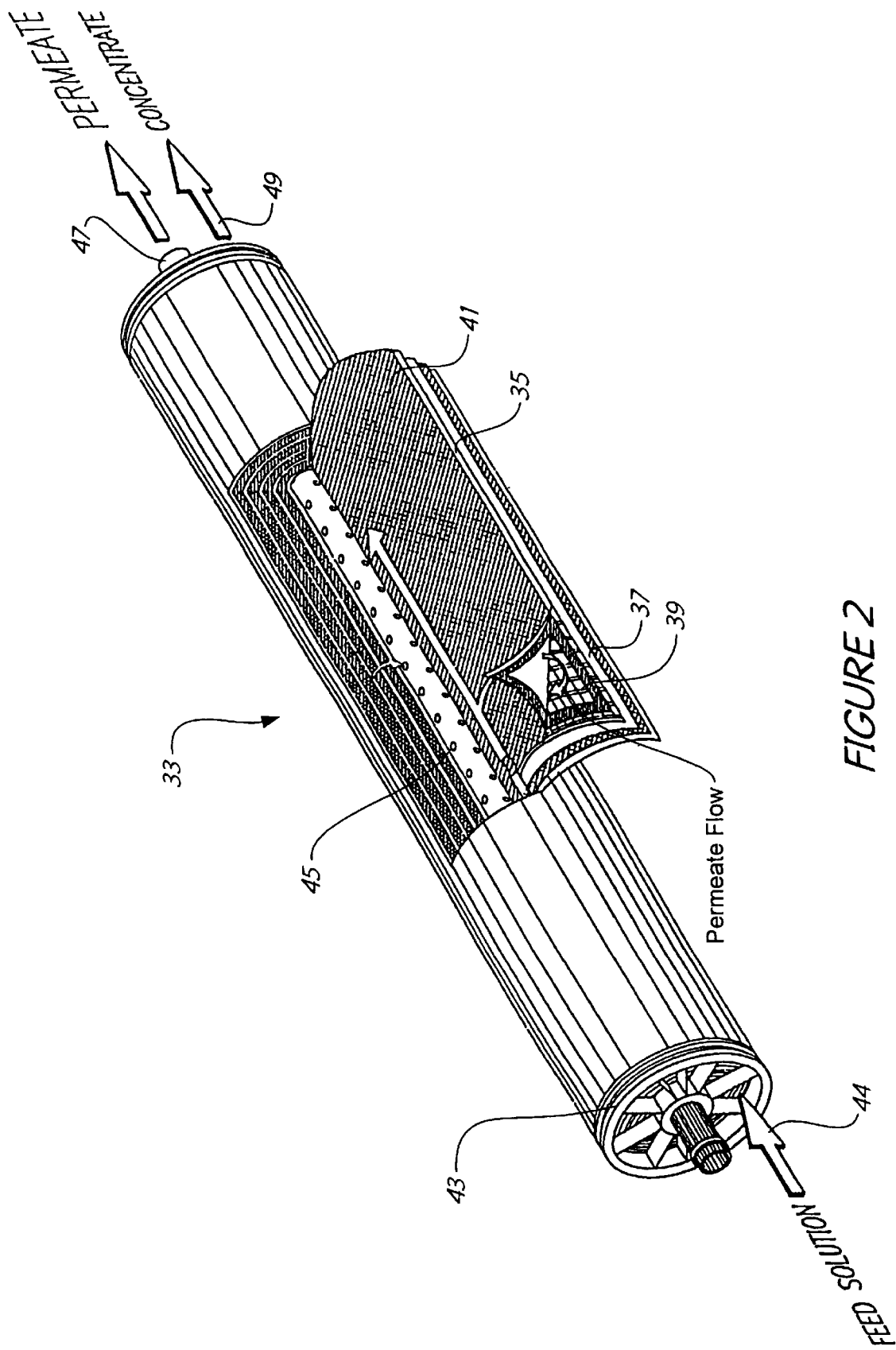
FIG. 2 is a perspective view of a spirally-wound nanofiltration membrane cartridge useful in the system illustrated in FIG. 1, with portions schematically broken open and unfolded to show details thereof.

The nanofiltration system preferably utilizes semipermeable membranes of the nanofiltration type, such as those sold as the DS-5 membrane by Desalination Systems, Inc., which membranes are effective to reject a high percentage, i.e. at least about 90%, of all divalent cations in an aqueous feed while permitting passage therethrough of a high percentage of all monovalent cations, such as sodium and potassium ions. As illustrated in FIG. 2, sheetlike nanofiltration membranes 35, which are integrally formed on sheetlike backing material 37, are spirally wound into cartridges 33, together with permeate carrier material 39 located adjacent the backing material surface thereof and feed channel material 41 adjacent the opposite dense membrane surface, as is well known in this art.

To facilitate the pumped flow of spent brine through these spirally-wound, sheetlike membrane cartridges 33 at a relatively high velocity, the spirally-wound cartridges which are employed should utilize relatively thick, open feed channel material 41, e.g. a thickness of about 0.5 mm to about 2.5 mm. Preferably an open mesh, polymeric material having a thickness of at least about 1 mm is used, and most preferably a feed spacer material is employed which has a thickness of about 2 mm and a structure such as that illustrated in U.S. Pat. No. 4,902,417, the disclosure of which is incorporated herein by reference.

Although a nanofiltration-type semipermeable membrane such as that sold as the DS-5 membrane is preferred, other nanofiltration membranes having these high divalent ion rejection characteristics are commercially available and may alternatively be employed. The treated spent brine enters the inlet end of each cartridge 33 through an anti-telescoping device (ATD) 43 (see arrow 44) and flows axially therethrough in the feed channels provided by the spacer material 41, in the direction of the elongated arrow centrally depicted in FIG. 2. A portion of the flow permeates through the membrane 35, and this permeate travels in the carrier material 39 to a perforated central tube 45, which discharges the permeate through an axially aligned outlet 47 which may be located at either axial end, or at both ends if desired. The portion of the feed which does not permeate through the membrane exits as a concentrate stream via an off-center outlet 49.

In the illustrated embodiment, two cartridges are used which are respectively located in pressure vessels 33a and 33b that are plumbed in series. The permeate stream from the first cartridge in pressure vessel 33a is discharged into a line 51 which contains a flowmeter 53 and which leads to a product tank 55 where the reclaimed, purified brine is accumulated. The concentrate stream 49 exiting from the first pressure vessel 33a is supplied as feed to the second cartridge in series in pressure vessel 33b. The permeate stream exiting from the second pressure vessel 33b is discharged through a line 57, which joins the line 51 at a junction upstream of the flowmeter and thus is also directed to the clean brine tank. The concentrate stream from the second pressure vessel 33b exits into an outline line 59 which contains a pressure gauge 61, and which branches at a tee into a return line 63 and a recirculation line 65. The return line 63 includes a pressure-regulating valve 67 which maintains the desired amount of back pressure on the liquid in the nanofiltration cartridges 33 to assure efficient separation is performed. The portion of the final concentrate stream flowing through this valve 67 passes through a flowmeter 69 and then returns to the brine feed tank 11. If a continuous system were used, a side discharge conduit 70 might be included just upstream of the entrance to the feed tank 11, through which a portion of the return flow could be discharged to waste.

The recirculation line 65 also includes a similar back pressure valve 71 and a recirculation flow meter 73. This line 65 terminates in a tee that joins the main supply line 12 at a location upstream of the booster pump 15. By appropriately setting the two back-pressure valves 67, 71, it is possible to regulate the percentage of concentrate that recirculates directly to the booster pump 15 and the percentage that is returned to the brine feed tank 11. In a continuous operation, a proportionate amount of the liquid flowing through the return line 63 would likely be directed to a side waste discharge 70, while the remainder would be recirculated. In batch operation, the return to the tank 11 may be designed to maintain a quiescent condition in the tank so that precipitation of calcium and magnesium sulfate would be promoted as the batch becomes more concentrated, which precipitates could be removed via the line 12a to a side drain.

It has been found that, by treating the feed brine with an appropriate amount of a soluble sulfate, preferably sodium sulfate, and an antiscalant, it is possible to operate the illustrated system to efficiently process brine containing substantial amounts of hardness and recover 90 to 95% of the spent brine in a form which is considered suitable for reuse in the regeneration of water-softening resins.

As examples of the efficiency of such a system, two spirally-wound nanofiltration elements made with DS-5 semipermeable membrane, which are 40 inches in length and 4 inches in diameter, are employed in a series relationship as shown in FIG. 1. The spent brine to be treated has TDS of about 130,000 mg/l, including about 19,000 mg/l of hardness. The pH of the spent brine is lowered with HCl to about 5.1, and sodium sulfate is added to provide a sodium sulfate level of about 1,500 ppm. Cyanomer P-70 antiscalant is added to provide a level of about 7.5 ppm. The high pressure pump 25 is operated to apply a pressure of about 800 psi to the liquid stream entering the first of the spirally-wound nanofiltration cartridges. An average flux equal to about 9 gallons per square foot per day is achieved using these two spirally-wound nanofiltration cartridges. The entire batch of spent brine is processed until about 90% of the original amount has become clean brine product, so that the brine feed tank now contains only about 10% of the original volume. Examination of the clean brine shows that it has a hardness of only about 4,000 ppm; this indicates that about 91% of the original hardness is removed as a result of the processing. The resultant recovered purified brine in the tank 55 is considered to be fully suitable for use in regenerating spent water-softening resins.

Following after the processing of each batch of spent brine, it is preferred to flush the cartridges 33 with soft water, and the discharge from such flush is advantageously incorporated in the next batch of spent brine to be processed.

As a further example, a single 8-inch diameter, 40-inch long spirally-wound nanofiltration element of DS-5 membrane is used to purify a spent sodium chloride brine having hardness equal to about 17,500 ppm, measured as calcium carbonate. The pH is adjusted with HCl to about 0.1 molar equivalent, and based upon the measured hardness of 17,500 ppm, sodium sulfate is added in an amount equal to about 5,000 ppm. Cyanomer P-70 is added at a level of about 7.5 ppm. To process a batch of about 1,000 gallons of such treated spent brine, a high pressure pump is employed to feed the treated brine to the 8-inch diameter element at a pressure of about 800 psi. The feed spacer in the 8-inch element has a thickness of about 2.1 mm, and operation of the pump maintains a velocity of about 10–15 cm per sec in the axial flow path through the element. At this pressure, the operation of the 8-inch diameter element produces a flux of about 2,000 to 2,500 gallons per day, based upon 24-hour operation, and operation is continued until about 950 gallons is present in the product clean brine tank and only 50 gallons remain in the feed tank. Testing shows that the hardness removal of the system is excellent, and the clean brine has a hardness of about 4,000 ppm and is considered satisfactory for use in the regeneration of water-softening resins.

As a result, it can be seen that spent brine, such as that obtained from the regeneration of water-softening membranes which is high in hardness as a result of containing divalent calcium and magnesium ions, can be economically and efficiently treated using suitable nanofiltration-type semipermeable membrane cartridges once the brine is treated by adding an appropriate amount of a soluble sulfate and appropriate antiscalant. As a result, not only are raw material costs lowered through reclaiming and reuse of the sodium chloride brine, but the environment is protected by avoiding needless discharges into a municipal sewer system or the like. Water resources are thus conserved from two different aspects.

Although the invention has been described with regard to certain preferred embodiments which constitute the best mode presently known to the inventor, it should be understood that various modifications and changes as would be obvious to one having ordinary skill in this art may be made without departing from the scope of the invention, which is set forth in the appended claims. For example, although spirally-wound membrane cartridges are preferred, other types of nanofiltration-type semipermeable membrane separation devices suitable for treating brine having these levels of TDS may alternatively be employed.

Particular features of the invention are emphasized in the claims which follow.

What is claimed is:

1. A method of reclaiming an aqueous brine solution used in the regeneration of water-softening resins, which method comprises the steps of:

(a) treating an aqueous NaCl or KCl brine solution that contains significant amounts of divalent cations, by adding (i) a soluble sulfate salt, (ii) with an acid selected from the group consisting of hydrochloric, sulfuric, nitric and phosphoric to lower the pH to about 0.5 and about 6, and (iii) a precipitation inhibitor selected from the group consisting of polyacrylic acid, polyacrylamide and polymalic acid;

(b) applying said treated brine from step (a) to semipermeable membrane material which permits the passage therethrough of at least about 90% of monovalent ions in said solution while rejecting at least about 90% of all divalent cations in said aqueous solution; and (c) recovering the permeate from step (b) for use in regenerating water-softening resins.

2. The method according to claim 1 wherein said step (b) is carried out by pumping said treated aqueous brine to a pressure of at least about 600 psi before applying same to said membrane material.

3. The method according to claim 2 wherein said cartridge has feed channel-providing spacer material located between facing sheets of semipermeable membrane material, which spacer material has a thickness of at least about 0.5 mm to about 2.5 mm.

4. The method according to claim 1 wherein said step (b) is carried out by pumping said treated aqueous solution to a high pressure and causing said high pressure treated brine to flow axially through a spirally-wound semipermeable membrane.

5. The method according to claim 4 wherein said treated brine is pumped through said spirally-wound cartridge at a pressure between about 600 and 1,000 psi and with an axial velocity through said cartridge of at least about 10 cm per second.

6. The method according to claim 1 wherein said cations are selected from the group consisting of $Ca^{++}$, $Ba^{++}$, or $Mg^{++}$ and combinations thereof.

7. The method according to claim 6 wherein said soluble salt is added in an amount to provide a weight % of sulfate ion equal to at least about one-half the total weight % of $Ca^{++}$ and $Mg^{++}$ cations in said aqueous brine being treated in step (a).

8. The method according to claim 7 wherein said precipitation inhibitor is a polyacrylamide and is added to said treated brine in an amount at least about 5 ppm.

9. The method according to claim 6 wherein at least about 85 volume % of said brine that is treated is recovered as permeate having $Mg^{++}$ and $Ca^{++}$ cations in an amount equal to about 5% or less of the weight % of such cations in said brine being treated in step (a).

10. The method according to claim 1 wherein said soluble sulfate is selected from the group consisting of sodium sulfate, potassium sulfate, lithium sulfate, ammonium sulfate and sodium hydrogen sulfate.

11. The method according to claim 10 wherein said pH is adjusted with HCl to between about 2 and about 5.

12. The method according to claim 1 wherein said brine being treated in step (a) contains total dissolved solids (TDS) of over 100,000 ppm, which includes hardness measured as calcium carbonate ($CaCO_3$) of at least 17,000 ppm, and wherein said permeate contains hardness measured as $CaCO_3$ of not greater than about 1,000.

13. A method for reclaiming a batch of aqueous brine used in the regeneration of water-softening resins or the like, which method comprises the steps of:

(a) treating a batch of aqueous NaCl or KCl brine containing hardness in the form of $Ca^{++}$ and $Mg^{++}$ cations in a tank by adding soluble sulfate, a strong acid, and a precipitation inhibitor, (b) withdrawing said treated brine from the tank and pumping same through a spirally-wound semipermeable membrane cartridge to create a permeate stream and a concentrated stream, which membrane permits the passage therethrough of at least about 90% of monovalent ions in said brine while rejecting at least about 90% of all divalent cations in said brine, so (c) recovering said permeate stream from the semipermeable membrane cartridge while returning at least a portion of said concentrate stream to said tank, and continuing said withdrawing of treated brine from said tank and pumping same through said cartridge until such time as at least about 90 volume % of said brine has been recovered as permeate containing less than 10% of $Ca^{++}$ and $Mg^{++}$ cations present in said batch of brine that was initially treated in step (a).

14. The method according to claim 13 wherein the tank is maintained in a quiescent condition so as to promote the precipitation of calcium and magnesium sulfate salts therein as said batch of brine in said tank becomes more concentrated.

15. A method for reclaiming a batch of aqueous brine used in the regeneration of water-softening resins or the like by removing hardness therefrom, which method comprises the steps of:

(a) treating aqueous NaCl or KCl brine solution containing hardness in the form of $Ca^{++}$ and $Mg^{++}$ cations by adding soluble sulfate, a strong acid, and a precipitation inhibitor so that said solution has a pH between about 0.5 and about 6, (b) pumping said treated brine from said tank through a spirally-wound semipermeable membrane cartridge to create a permeate stream and a concentrated stream, which membrane permits the passage therethrough of at least about 90% of monovalent ions in said brine while rejecting at least about 90% of all divalent cations in said brine, so (c) recovering said permeate stream from the semipermeable membrane cartridge while recirculating at least a portion of said concentrate stream, and continuing said pumping of treated brine through said cartridge including said portions being recirculated so that recovery of at least about 80 volume % of said brine that is treated is recovered as permeate containing less than 10% of $Ca^{++}$ and $Mg^{++}$ cations present in said initially treated brine.

16. The method according to claim 15 wherein said brine being treated in step (a) contains total dissolved solids (TDS) of over 100,00 ppm, which includes hardness measured as calcium carbonate ($CaCO_3$) of at least 17,000 ppm, and wherein said permeate being recovered contains hardness measured as $CaCO_3$ of not greater than about 1,000.

17. The method according to claim 15 wherein said treated brine is pumped axially through said cartridge at an average velocity of at least about 10 cm per second.

18. The method according to claim 17 wherein said soluble salt is added in an amount to provide a weight % of sulfate ion equal to at least about one-half the total weight % of $Ca^{++}$ and $Mg^{++}$ cations in said aqueous brine being treated in step (a).

19. The method according to claim 18 wherein said soluble sulfate is selected from the group consisting of sodium sulfate, potassium sulfate, lithium sulfate, ammonium sulfate and sodium hydrogen sulfate.

* * * * *

UNITED STATES PATENT AND TRADEMARK OFFICE
CERTIFICATE OF CORRECTION

PATENT NO : 6,004,464
DATED : December 21, 1999
INVENTOR(S) : Larry A. Lien

It is certified that error appears in the above-identified patent and that said Letters Patent is hereby corrected as shown below:

Column 1, lines 20, 22-23, correct the spelling of "solublized".
Column 3, line 42, change "tradename" to --trade name--.
Column 5, line 37, correct the spelling of "Cyanamer".
Column 7 (Claim 13), line 53, after "brine" delete "so";
Column 7 (Claim 13), line 57, before "continuing" insert --(d)--.
Column 8 (Claim 15), line 27, after "brine" delete "so";
Column 8 (Claim 15), line 30, after "and" begin new paragraph and insert --(d)--.

Signed and Sealed this

Twenty-first Day of November, 2000

Q. TODD DICKINSON

*Attest:*

*Attesting Officer*       *Director of Patents and Trademarks*